(12) United States Patent
Jeong

(10) Patent No.: US 12,393,881 B1
(45) Date of Patent: Aug. 19, 2025

(54) HUMAN DE-IDENTIFICATION INFORMATION COLLECTION DEVICE OPERATING HARDWARE ORCHESTRATION FOR INTERACTIVE ARTIFICIAL INTELLIGENCE LEARNING

(71) Applicant: Soyoung Jeong, Seoul (KR)

(72) Inventor: Soyoung Jeong, Seoul (KR)

( * ) Notice: Subject to any disclaimer, the term of this patent is extended or adjusted under 35 U.S.C. 154(b) by 0 days.

(21) Appl. No.: 19/037,580

(22) Filed: Jan. 27, 2025

(30) Foreign Application Priority Data

Apr. 24, 2024 (KR) .................. 10-2024-0054546
May 15, 2024 (KR) .................. 10-2024-0063505

(51) Int. Cl.
*G06N 20/00* (2019.01)
*A01K 11/00* (2006.01)
*A01K 29/00* (2006.01)
*A01K 27/00* (2006.01)

(52) U.S. Cl.
CPC ............. *G06N 20/00* (2019.01); *A01K 11/008* (2013.01); *A01K 29/005* (2013.01); *A01K 27/001* (2013.01); *A01K 27/002* (2013.01)

(58) Field of Classification Search
CPC .... G06N 20/00; A01K 11/008; A01K 29/005; A01K 27/001; A01K 27/002
See application file for complete search history.

(56) References Cited

U.S. PATENT DOCUMENTS

2025/0000478 A1 * 1/2025 VanDam .................. A61B 7/02

FOREIGN PATENT DOCUMENTS

| KR | 10-2018-0009239 A | 1/2018 |
| KR | 10-2019-0055528 A | 5/2019 |
| KR | 10-2449905 B1 | 10/2022 |
| KR | 10-2023-0020707 A | 2/2023 |
| KR | 10-2023-0021224 A | 2/2023 |
| KR | 10-2024-0085800 A | 6/2024 |

OTHER PUBLICATIONS

Goodall, William, Flynt Wallace, and Melody Jackson. "KitBit: an instrumented collar for indoor pets." In Proceedings of the Tenth International Conference on Animal-Computer Interaction, pp. 1-8, 2023. (Year: 2023).*
Office Action issued Mar. 27, 2025 in Korean Patent Application No. 10-2024-0063505.

* cited by examiner

*Primary Examiner* — Casey R. Garner
(74) *Attorney, Agent, or Firm* — Sughrue Mion, PLLC

(57) ABSTRACT

A human de-identification information collection device for artificial intelligence learning according to an embodiment may comprise: at least one microphone for capturing sounds generated around a companion animal and generating first audio data and second audio data, an inertial measurement device for generating inertial data about a change in acceleration and angular velocity according to movement of the companion animal, and a processor for determining each sampling rate for collecting the first audio data, the second audio data, and the inertial data on the basis of at least one among a breed, an age, a gender, whether or not neutered, and a temperament type of the companion animal.

12 Claims, 7 Drawing Sheets

Figure 3

| Category | Data Format | Description | Equipment Used |
|---|---|---|---|
| Inertial data 311 | Time series | 6-dimensional time series data composed of accelerations and angular velocities along tree axes | IMU 111 |
| First audio data 312 | Audio | [Non-Voice] 20~48kHz. The audible frequency range for dogs | Wide-range MIC 112-1 |
| Second audio data 313 | Audio | [Non-Voice] ~20kHz. The audible frequency range for humans | MIC 112-2 |
| | | [Voice] Human Voice, Canine Voice | |
| Third audio data 430 | Audio | A corpus containing pet parent's voice | Application |
| Olfactory data 440 | Time series | Create a reference database with 32 smells at three concentration levels for calibration, addressing noise issues in field gas sensor graphs | Gas Sensor 113 |
| Environmental data 450 | Text | Temperature, Humidity, Location | Application |
| Profile data 460 | Text | Breed, Age, Gender, Neutered | Application |
| | | Dog Temperament Types (Individual project on classification methods underway) | Application |
| Cond (Experimental Conditions) 470 | Time series | Electrocardiogram (ECG), Photoplethysmogram (PPG), Electroencephalography (EEG) | Bio sensor 114 |
| Video data 480 | Video(Images) | A third-person perspective camera capturing the appearance of the target dog | Camera 115 |

Figure 4
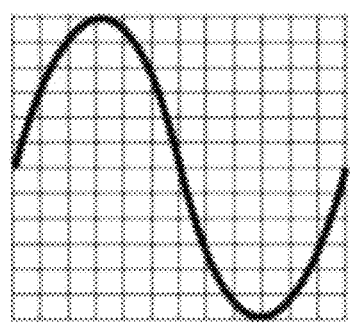
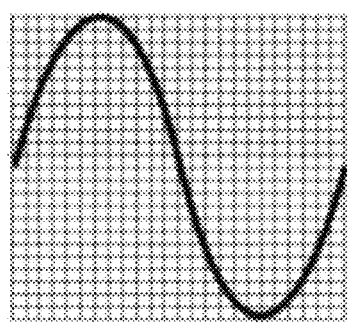
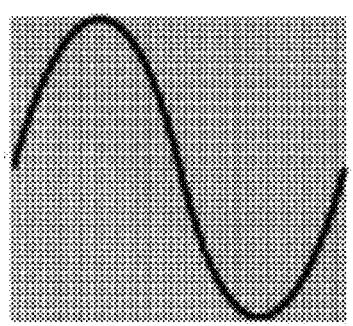
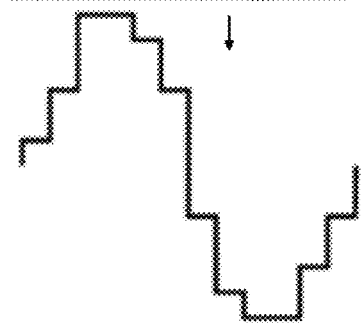
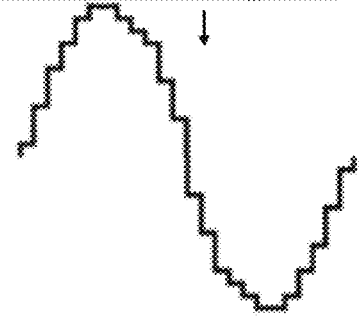
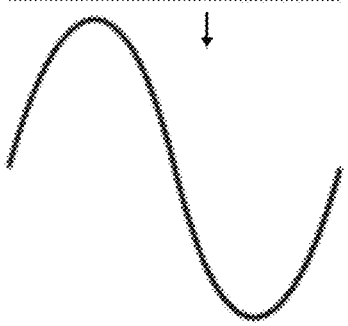
411　　　　　　　　　412　　　　　　　　　413

701　　　　　　　702　　　　　　　703

HUMAN DE-IDENTIFICATION INFORMATION COLLECTION DEVICE OPERATING HARDWARE ORCHESTRATION FOR INTERACTIVE ARTIFICIAL INTELLIGENCE LEARNING

BACKGROUND OF THE INVENTION

Field of the Invention

The present disclosure relates to a collection device for artificial intelligence learning, and more specifically, to a human de-identification information collection device that operates hardware orchestration for interactive artificial intelligence learning, and an operation method thereof.

Background of the Related Art

As the number of modern people suffering from loneliness increases due to nuclear families, increase in single-person households, and population aging, the number of people who recognize companion animals as family members is increasing. Companion animals enjoy everyday life with their owners, and interest in opinion expressions of the companion animals is also increasing.

With the changes in the social perception about companion animals, research on various devices and services for people living together with companion animals is actively under progress. For example, a method of remotely managing a companion animal through a wearable device attached to the companion animal is proposed, and devices for collecting health information of pets using detection sensors mounted on a wearable device and measuring location information of the pet using a GPS module or a beacon module mounted on the wearable device are also provided.

SUMMARY OF THE INVENTION

A human de-identification information collection device for artificial intelligence learning according to an embodiment may comprise: at least one microphone for capturing sounds generated around a companion animal and generating first audio data and second audio data; an inertial measurement device for generating inertial data about a change in acceleration and angular velocity according to a movement of the companion animal; and a processor for adaptively determining each sampling rate for collecting the first audio data, the second audio data, and the inertial data on the basis of at least one among a breed, an age, a gender, whether or not neutered, and a temperament type of the companion animal.

According to an embodiment, the processor may define each interpolation model on the basis of a multiple linear regression algorithm using the sampling rate of each of the first audio data, the second audio data, and the inertial data. The processor may interpolate the first audio data, the second audio data, and the inertial data on the basis of each interpolation model.

According to an embodiment, the processor may manage operation modes—the operation modes include an active mode and a low power mode—of the at least one microphone. The low power mode may be a mode in which the sampling rate for collecting data is low and complexity of the interpolation model is low compared to the active mode.

According to an embodiment, when a voice of a pet parent of the companion animal is identified through the second audio data or when a walking state of the companion animal is identified through the inertial data, the processor may set the at least one microphone to the active mode. When a sleeping state of the companion animal is identified through the inertial data, the processor may set the at least one microphone to the low power mode.

According to an embodiment, the at least one microphone may include: a first microphone for capturing sounds in an audible frequency band of the companion animal, and including a filter for outputting the first audio data in an inaudible frequency band of human being; and a second microphone for outputting the second audio data in an audible frequency band of human being.

According to an embodiment, the at least one microphone may be a microphone that captures sounds in an audible frequency band of the companion animal and includes a first filter for outputting the first audio data in an inaudible frequency band of human being, and a second filter for outputting the second audio data in an audible frequency band of human being.

According to an embodiment, the collection device may further comprise a gas sensor for generating olfactory data by detecting gas contained in the air around the companion animal. The olfactory data may have three concentration levels for each of smells familiar to the companion animal, smells unfamiliar to the companion animal, smells based on racial classification, smells of people that the companion animal has met, smells of spaces that the companion animal has visited, smells of textiles unique to the home, smells of mainly cooked food, and smells according to the gender, race, cleanliness, food consumed, and health of a pet parent.

According to an embodiment, the processor may perform noise filtering on the first audio data, the second audio data, the inertial data, and the olfactory data. The processor may simultaneously calibrate the first audio data, the second audio data, the inertial data, and the olfactory data, on which the noise filtering has been performed.

According to an embodiment, the collection device may further comprise a biometric sensor for measuring at least one among an electrocardiogram (ECG), a photoplethysmogram (PPG), and an electroencephalography (EEG) of the companion animal; a Global Positioning System (GPS) for measuring a location of the companion animal; and a camera for capturing at least a portion of the companion animal.

According to an embodiment, the collection device may be implemented as a smart collar, a smart harness, a wearable device, or an accessory of the companion animal.

BRIEF DESCRIPTION OF THE DRAWINGS

FIG. 3 is a view for explaining data output from a sensor of a human de-identification information collection device according to an embodiment.

FIG. 4 is a view for explaining the sampling rate of a sensor according to an embodiment.

DETAILED DESCRIPTION OF THE PREFERRED EMBODIMENT

Figure 1:
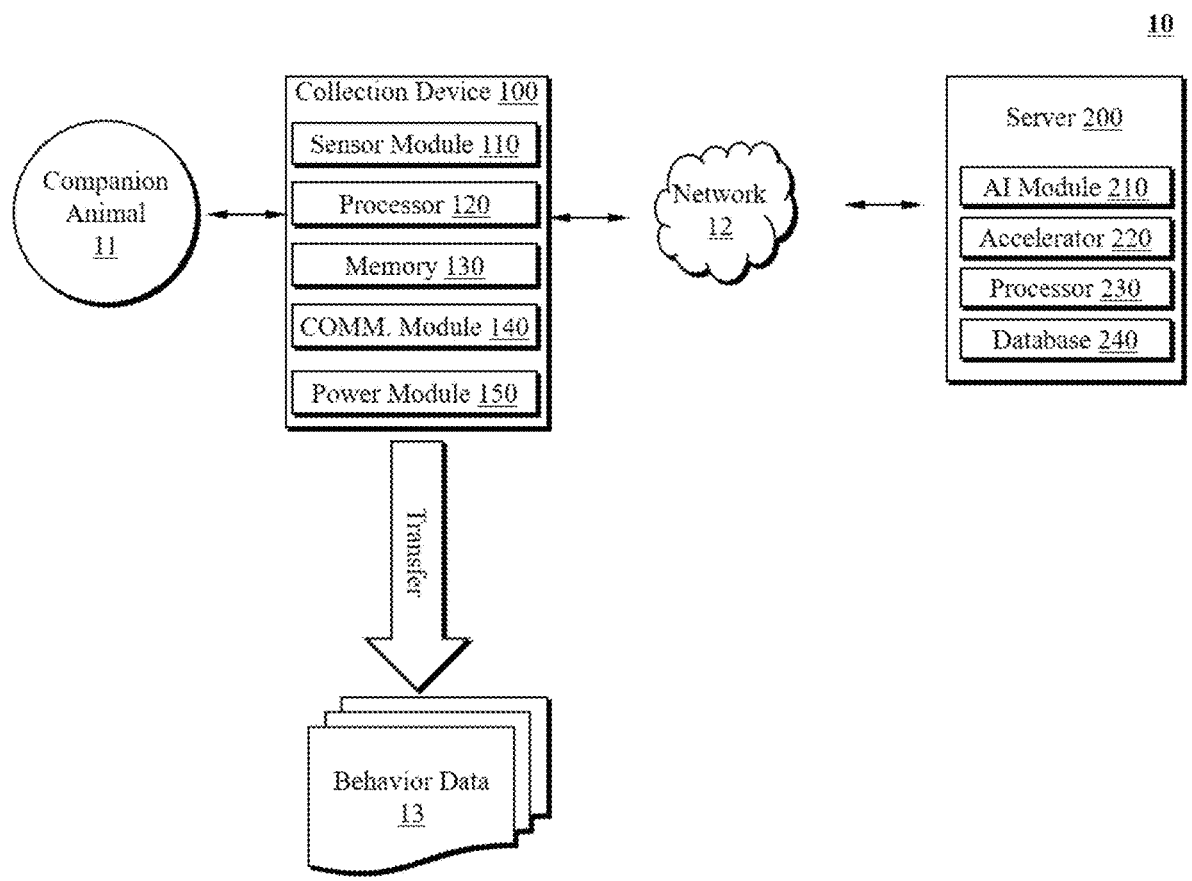
FIG. 1 is a view showing a system architecture that performs artificial intelligence learning on the basis of human de-identification information according to an embodiment.

Specific structural or functional descriptions of the embodiments are disclosed only for illustrative purposes and may be implemented to be changed in various forms. Accordingly, actually implemented forms are not limited to the disclosed specific embodiments, and the scope of this specification includes changes, equivalents, or substitutes included in the technical spirit described in the embodiments.

Although terms such as first, second, and the like may be used to describe various components, these terms should be interpreted only for the purpose of distinguishing one component from another component. For example, a first component may be named a second component, and similarly, a second component may also be named a first component.

When a certain component is mentioned as being "connected" to another component, it may be directly connected or coupled to another component, but it should be understood that other components may exist in between.

Singular expressions include plural expressions unless the context clearly dictates otherwise. In this document, each of phrases such as "A or B", "at least one among A and B", "at least one among A or B", "A, B or C", "at least one among A, B and/or C", "at least one among A, B or C" may include any one among the items listed together in a corresponding phrase among the phrases or all possible combinations thereof. In this specification, terms such as "comprise", "have", and the like should be understood as intended to indicate the presence of the described features, numbers, steps, operations, components, parts, or combinations thereof, and not to exclude in advance the presence or addition of one or more other features, numbers, steps, operations, components, parts, or combinations thereof.

Unless defined otherwise, all terms used herein, including technical or scientific terms, have the same meaning as commonly understood by those skilled in the art. Terms defined in commonly used dictionaries should be interpreted as having a meaning consistent with the meaning in the context of related technologies, and should not be interpreted in an ideal or excessively formal sense unless explicitly defined in this specification.

The term "module" used in this document may include units implemented in hardware, software, or firmware, and may be used interchangeably with the terms such as logic, logic blocks, parts, circuits, or the like. The module may be an integrated part, a minimum unit of a part that performs one or more functions, or a part thereof. For example, according to an embodiment, the module may be implemented in the form of an application-specific integrated circuit (ASIC).

The term '~unit' used in this document means a software component or a hardware component such as FPGA or ASIC, and the '~unit' performs a predetermined function. However, the '~unit' is not a meaning limited to software or hardware. The '~unit' may be configured to reside in an addressable storage medium and may be configured to regenerate on one or more processors. For example, the '~unit' may include software components, object-oriented software components, components such as class components and task components, processors, functions, properties, procedures, subroutines, segments of program code, drivers, firmware, microcode, circuits, data, databases, data structures, tables, arrays, and variables. Functions provided in the components and '~units' may be combined into a smaller number of components and '~units' or may be further separated into additional components and '~units'. In addition, the components and '~units' may be implemented to regenerate one or more CPUs within a device or a secure multimedia card. In addition, '~unit' may include one or more processors.

Hereinafter, embodiments will be described in detail with reference to the accompanying drawings. In describing with reference to the accompanying drawings, like reference numerals will be given to like components regardless of reference symbols, and duplicate descriptions thereof will be omitted.

FIG. 1 is a view showing a system architecture that performs artificial intelligence learning on the basis of human de-identification information according to an embodiment.

Referring to FIG. 1, a system 10 according to an embodiment may perform artificial intelligence learning based on human de-identification information. The system 10 may include a human de-identification information collection device 100 (hereinafter, referred to as collection device) and a server 200.

According to an embodiment, the collection device 100 may collect information (e.g., both human identification information and human de-identification information) around a companion animal 11. The collection device 100 may be worn on the companion animal 11 and maintain a state of being spaced apart from the companion animal 11 as much as a predetermined distance. The information collected by the collection device 100 may be transferred to behavior data 13 of the companion animal 11.

According to an embodiment, the collection device 100 and the server 200 (e.g., the server 108 in FIG. 1) may be connected through a network 12 (e.g., a local area network (LAN), a wide area network (WAN), a value-added network (VAN), a mobile radio communication network, a satellite communication network, or a combination thereof). The collection device 100 and the server 200 may communicate with each other using a wired communication method or a wireless communication method (e.g., wireless LAN (Wi-Fi), Bluetooth, Bluetooth low energy, ZigBee, Wi-Fi direct (WFD), ultra-wide band (UWB), infrared data association (IrDA), or near field communication (NFC)).

According to an embodiment, the collection device 100 may include a sensor module 110, a processor 120, a memory 130, a communication module 140, and a power module 150. The sensor module 110 may detect information around the companion animal 11. The sensor module 110 may include a plurality of sensors (or units) (e.g., see FIG. 2). The processor 120 (e.g., an application processor) may access the memory 130 and execute one or more instructions. The memory 130 may store various data used (or collected) by at least one component (e.g., the processor 120 or the sensor module 110) of the collection device 100. The communication module 140 may support establishing a communication channel between the collection device 100 and the server 200 (or an external electronic device) and performing communication through the established communication channel. The power module 150 may supply power to at least one component of the collection device 100. The power module 150 may include a rechargeable secondary battery or a fuel cell. When a power supply is connected to the power module 150 and the collection device 100 is in a charging state, the collection device 100 may activate the communication module 140 and transmit the collected information to the server 200.

According to an embodiment, the server 200 may train an artificial intelligence model on the basis of information (e.g., both human identification information and human de-identification information) collected by the collection device 100. Training the artificial intelligence model may be performed by an artificial intelligence module 210, and the server 200 may utilize an accelerator 220 and a processor 230 together when training the artificial intelligence model. The server 200 may store the information (e.g., both human identification information and human de-identification information) collected by the collection device 100 in the database 240 and use the information when training the artificial intelligence model.

According to an embodiment, the collection device 100 may efficiently collect human de-identification information, as well as human identification information, by imitating sensory organs of an animal (e.g., companion animal 11). 1) The collection device 100 may include a microphone (e.g., at least one microphone 112 in FIG. 2) for collecting sounds in the inaudible frequency band of human being, and a gas sensor (e.g., the gas sensor 113 in FIG. 2) for collecting smells that cannot be sensed by a human being. 2) Companion animals may also have different sensitive and insensitive sensory organs according to the breed, age, gender, whether or not neutered, temperament, or the like. The collection device 100 may adaptively determine a sampling rate of a sensor corresponding to a sensory organ considering sensitivity different for each sensory organ. For example, the sampling rate of a sensor corresponding to a sensitive sensory organ may be set to a high value. 3) Sensitivity of a sensory organ may vary according to the state of a companion animal (e.g., walking, sleeping, immediately after identifying the voice of the pet parent). When the collection device 100 identifies a specific state of the companion animal, it may set the operation mode of sensors to an active mode or a low power mode. By setting the operation mode of the sensors according to the state of a companion animal, the collection device 100 may be implemented as a wearable device of low power.

According to an embodiment, the collection device 100 may be designed considering sensor orchestration. As the collection device 100 includes sensors (or units) corresponding to sensory organs of an animal, the collection device 100 may be a multi-sensor device. The collection device 100 may effectively integrate and manage data acquired from different types of sensors. For example, as the data collected from each sensor (or unit) is a sampled result, it does not need to be interpolated. In addition, as described above, since the collection device 100 includes a plurality of sensors (or units) of different sampling rates, it is needs to comprehensively consider the characteristics of different data when interpolating data. The collection device 100 may define an interpolation model for each data on the basis of a multiple linear regression algorithm using each sampling rate. Hereinafter, the structure and operation of the collection device 100 will be described in more detail.

Figure 2:
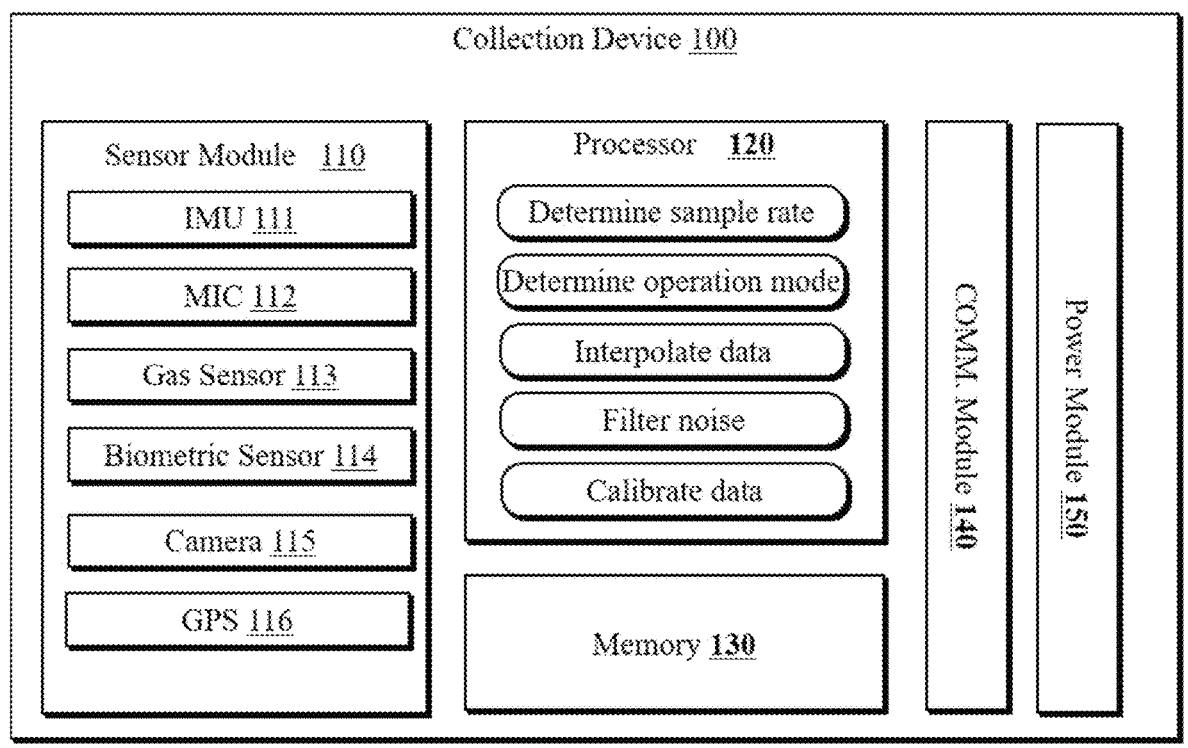
FIG. 2 is a block diagram showing a human de-identification information collection device according to an embodiment.

FIG. 2 is a block diagram showing a human de-identification information collection device according to an embodiment, and FIG. 3 is a view for explaining data output from a sensor of a human de-identification information collection device according to an embodiment.

Referring to FIG. 2, according to an embodiment, the collection device 100 may collect human de-identification information (and/or human identification information) for artificial intelligence learning through the sensor module 110. The sensor module 110 includes an inertial measurement device 111, at least one microphone 112, a gas sensor 113, a biometric sensor 114, a camera 115, and a Global Positioning System (GPS) 116.

According to an embodiment, the inertial measurement device 111 may generate inertial data. Referring to FIG. 3, the inertial data 311 is time series data and may be data about the change in acceleration and angular velocity according to movement of the companion animal. The inertial measurement device 111 may include an acceleration sensor and a gyro sensor and may be referred to as an inertial sensor.

According to an embodiment, at least one microphone 112 may capture sounds generated around a companion animal and generate first audio data 312 and second audio data 313. At least one microphone 112 may include a first microphone 112-1 (e.g., all band MIC) that captures sounds in the audible frequency band of a companion animal. The first microphone 112-1 may include a filter (e.g., a band-pass filter or a high-pass filter) for outputting the first audio data 312 (e.g., audio data in the 20 to 40 kHz band) in the inaudible frequency band of human being. At least one microphone 112 may include a second microphone 112-2 (e.g., stereo LFA MIC) that captures sounds of audible frequency of human being. The second microphone 112-2 may output the second audio data 313 (e.g., audio data in the 0 to 20 kHz band).

According to an embodiment, at least one microphone 112 may include only one microphone that captures sounds in the audible frequency band of a companion animal. At this point, the one microphone may include a first filter (e.g., a band-pass filter or a high-pass filter) for outputting the first audio data 312 in the inaudible frequency band of human being, and a second filter (e.g., low-pass filter) for outputting the second audio data 313 in the audible frequency band of human being.

According to an embodiment, a third audio data 430 may correspond to the voice of the pet parent of a companion animal. The third audio data 430 may be collected from an external electronic device of the collection device 100, and the third audio data 430 may be received through the communication module 140.

According to an embodiment, the gas sensor 113 may generate olfactory data 440 by detecting gas contained in the air around a companion animal. The olfactory data 440 may have three concentration levels for each of smells familiar to the companion animal, smells unfamiliar to the companion animal, smells based on racial classification, smells of people that the companion animal has met, smells of spaces that the companion animal has visited, smells of textiles unique to the home, smells of mainly cooked food, and smells according to the gender, race, cleanliness, food consumed, and health of the pet parent.

According to an embodiment, environmental data 450 and profile data 460 may be collected from an external electronic device (or server) of the collection device 100. The environmental data 450 may include information on the temperature, humidity, and/or location of the environment in which the companion animal is located. The profile data 460 may include the profile of the companion animal (e.g., breed, age, gender, whether or not neutered, and/or temperament type).

According to an embodiment, the biometric sensor 114 may generate biometric data 470. The biometric(cond) data 470 may include an electrocardiogram (ECG), photoplethysmogram (PPG), and/or electroencephalography (EEG) of a companion animal.

According to an embodiment, the camera 115 may generate video data 480 (or image data). The video data 480 may be a picture capturing at least a part (e.g., tail) of a companion animal. The Global Positioning System (GPS) 116 may be a device that measures the location of the companion animal. Based on the GPS 116, the collection device 100 may receive the environmental data 450 on the environment in which the companion animal is located.

Referring to FIG. 2, according to an embodiment, the processor 120 may determine a sampling rate, determine an operation mode, and perform data interpolation, noise filtering, and/or calibration. Specific operations of the processor 120 will be described in detail with reference to FIGS. 4 to 6.

FIG. 4 is a view for explaining the sampling rate of a sensor according to an embodiment.

Referring to FIG. 4, it can be confirmed that the shapes 411, 412, and 413 of data output from the sensor vary according to the sampling rate of the sensor. The sampling rate of the sensor is a speed of sampling information by the sensor, and may correspond to the frequency of collecting information by the sensor. The sampling rate of the sensor may be expressed as the number of data output per second by the sensor.

For example, when the gas sensor measures gas once a second, the sampling rate of the gas sensor may be 1 Hz. Sensors such as a camera may have a higher sampling rate compared to the gas sensor, and this means that the camera may measure the environment with a higher resolution and a higher accuracy compared to the gas sensor.

Although the higher the sampling rate of the sensor, the faster the environmental change may be detected, it may be difficult to process as the amount of collected information is larger. On the contrary, when the sampling rate is too low, the environmental change may not be properly detected. Therefore, the sampling rate of the sensor needs to be set differently according to the requirements of the sensor.

Companion animals may vary in breed, age, gender, whether or not neutered, temperament, and the like for each entity, and each entity may have different sensitive sensory organs and insensitive sensory organs. A collection device (e.g., the collection device 100 in FIG. 1) according to an embodiment may adaptively determine the sampling rate of a sensor considering sensitivity different for each sensory organ. For example, the sampling rate of a sensor corresponding to a sensitive sensory organ may be set to a large value. That is, the collection device 100 may acquire profile data (e.g., the profile data 460 in FIG. 3) of a companion animal (e.g., the companion animal 11 in FIG. 1) through a communication module (e.g., the communication module 140 in FIG. 1), and adaptively determine each sampling rate for collecting first audio data, second audio data, inertial data, and olfactory data.

According to an embodiment, the collection device 100 may efficiently collect human de-identification information, as well as human identification information, by imitating sensory organs of animals.

Figure 5:
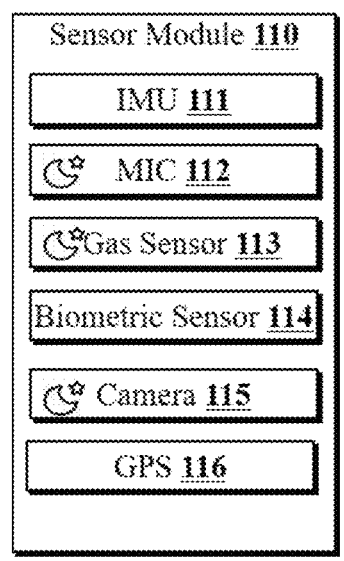
FIG. 5 is a view for explaining the operation modes of a sensor according to an embodiment.

FIG. 5 is a view for explaining the operation modes of a sensor according to an embodiment.

Implementation of low power to increase practicality of wearable devices may be an important issue. A collection device (e.g., the collection device 100 in FIG. 1) according to an embodiment may manage operation modes of sensors (e.g., 111 to 116 in FIG. 2) included is a sensor module (e.g., the sensor module 110 in FIG. 1). The operation modes may include an active mode and a low power mode. The low power mode may be a mode in which the sampling rate for collecting data is lower than that of the active mode.

Referring to FIG. 5, for example, the collection device 100 may set at least one microphone 112, gas sensor 113, and camera 115 to a low power mode. When the sleeping state of a companion animal is identified through inertial data (e.g., the inertial data 311 in FIG. 3), the collection device 100 may set at least one microphone 112, the gas sensor 113, and/or the camera 115 to a low power mode.

According to an embodiment, when the voice of the pet parent of a companion animal is identified through second audio data (e.g., the second audio data 313 in FIG. 3) or when a walking state of the companion animal is identified through the inertial data 311, the collection device 100 may set at least one microphone 112, gas sensor 113, and/or camera 115 to an active mode.

Sensitivity of a sensory organ may vary according to the state of a companion animal (e.g., walking, sleeping, immediately after identifying the voice of the pet parent). As a function of identifying a specific state of the companion animal and setting an operation mode of sensors according to the identified specific state is mounted on the collection device 100 according to an embodiment, the collection device 100 may be implemented as a wearable device of low power.

As described above, in the low power mode, the sampling rate for collecting data, as well as the complexity of the interpolation model, may be set low compared to the active mode. Hereinafter, interpolation will be explained.

Figure 6:
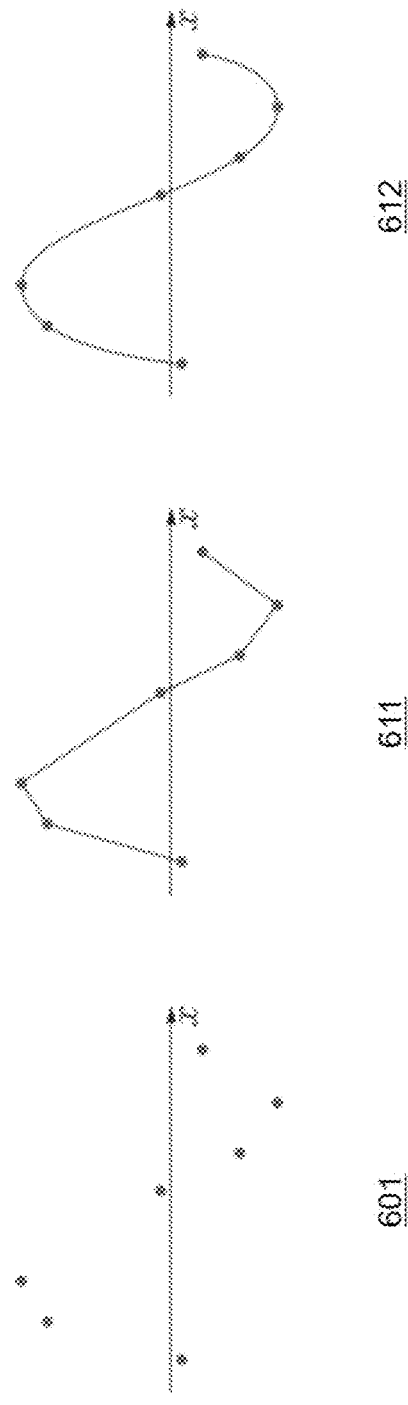
FIG. 6 is a view for explaining sensor orchestration according to an embodiment.

FIG. 6 is a view for explaining sensor orchestration according to an embodiment.

Referring to FIG. 6, since the data output from each sensor (or unit) included in the sensor module (e.g., the sensor module 110 in FIG. 1) is a sampled result (e.g., 601), the collection device (e.g., the collection device 100 in FIG. 1) does not needs to interpolate the data. However, the shape of the interpolated data may vary according to how the interpolation model is defined (e.g., see 611 and 612). When polynomial interpolation is used, the accuracy and complexity have a trade-off relation in the interpolation model. Referring to Equation 1, the polynomial interpolation model may be confirmed.

$$y = a_{n-1}x^{(n-1)} + a_{n-2}x^{(n-2)} + \ldots + a_1x + a_0 \quad \text{[Equation 1]}$$

In Equation 1, y may be a polynomial interpolation model, n−1 may be the order of the polynomial interpolation model, and $a_{n-1}$ may be a coefficient. Since the accuracy of the interpolated data and the complexity of the interpolation model may vary according to the order of the polynomial interpolation model, an appropriate order of the polynomial interpolation model needs to be determined for each data.

In addition, as described above, since the sampling rate of each sensor is different, the collection device 100 needs to comprehensively consider the characteristics of different data when interpolating the data.

The collection device 100 according to an embodiment may define an interpolation model for each data (e.g., determine the order of the interpolation model) on the basis of a multiple linear regression algorithm using the sampling rate of each sensor. The multiple linear regression algorithm may be an algorithm that models the linear relation between a dependent variable and one or more independent variables. Referring to Equation 2, the equation of the multiple linear regression algorithm can be confirmed.

$$Y = \beta_0 + \beta_1 X_1 + \beta_2 X_2 + \ldots + \beta_N X_N + \in \quad \text{[Equation 2]}$$

In Equation 2, Y is the dependent variable, $X_N$ is the N-th independent variable, $\beta_N$ is a weight multiplied by the N-th independent variable, and $\in$ may be an error.

The collection device 100 according to an embodiment may utilize the sampling rates of the first audio data, second audio data, inertial data, and olfactory data in the multi-linear algorithm. Specifically, the order of the polynomial interpolation model can be obtained as Y, which is a dependent variable, by inputting the sampling rate of data in each independent variable $X_N$. At this point, the weight and error multiplied by the independent variable may be acquired for each data (e.g., each sensor) by experiment.

As the order of the polynomial interpolation model is determined, the collection device 100 according to an embodiment may define the polynomial interpolation model by inputting sampling data. Thereafter, the collection device 100 may interpolate each data on the basis of the polynomial interpolation model.

That is, the collection device 100 according to an embodiment may be designed considering sensor orchestration. As the collection device 100 includes sensors (or units) corresponding to sensory organs of an animal, the collection device 100 may be a multi-sensor device. The collection device 100 may effectively integrate and manage data acquired from different types of sensors.

Figure 7:
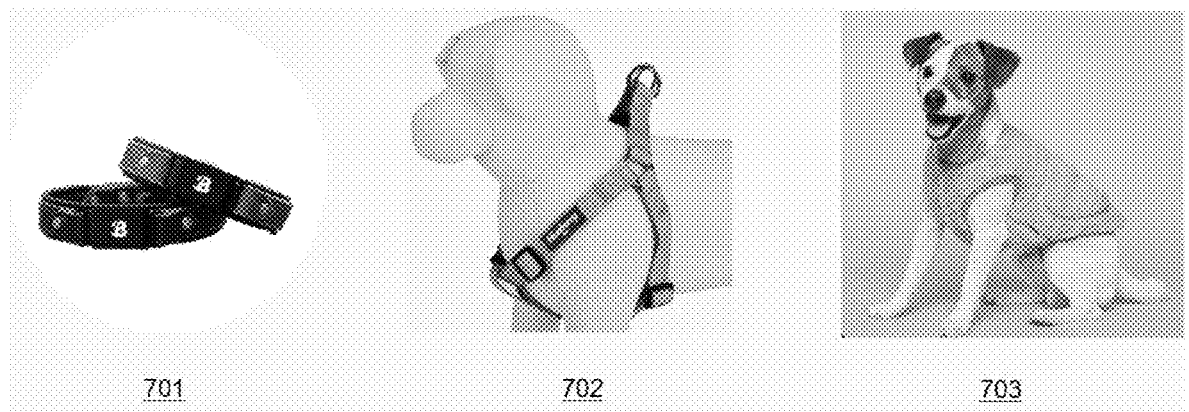
FIG. 7 is a view showing an example of hardware implementation of a human de-identification information collection device according to an embodiment.

FIG. 7 is a view showing an example of hardware implementation of a human de-identification information collection device according to an embodiment.

Referring to FIG. 7, according to an embodiment, a collection device (e.g., the collection device 100 in FIG. 1) may be implemented in a form that can be worn on a companion animal. For example, the collection device 100 may be implemented as a smart collar 701, a smart harness 702, or a wearable device 703. However, the collection device 100 may also be implemented as an accessory that maintains a state of being spaced apart from the companion animal as much as a predetermined distance.

The collection device according to the embodiments disclosed in this document may be devices of various forms. The collection device may include, for example, portable communication devices (e.g., smart phones), computer devices, portable multimedia devices, portable medical devices, cameras, wearable devices, and home appliances. The collection device according to the embodiment of this document is not limited to the devices described above.

Embodiments of this document and terms used herein are not intended to limit the technical features described in this document to specific embodiments, and should be understood to include various changes, equivalents, or substitutes of a corresponding embodiment. In relation to the description of drawings, similar reference numerals may be used for similar or related components. The singular form of a noun corresponding to an item may include one or a plurality of items unless a related context clearly dictates otherwise. In this document, each of phrases such as "A or B", "at least one among A and B", "at least one among A or B", "A, B or C", "at least one among A, B and C", "at least one among A, B or C" may include any one among the items listed together in a corresponding phrase among the phrases or all possible combinations thereof. Terms such as "a first", "a second", "the first", "the second", and the like may be used simply to distinguish a corresponding component from another component and do not limit corresponding components in different aspects (e.g., importance or sequence). When a certain component (e.g., a first component) is mentioned to be "coupled" or "connected" to another component (e.g., a second component) with or without a term such as "functionally" or "communicatively", this means that the certain component may be connected to another component directly (e.g., wiredly), wirelessly, or through a third component.

The term "module" used in the embodiments of this document may include units implemented in hardware, software, or firmware, and may be used interchangeably with the terms such as logic, logic blocks, parts, circuits, or the like. The module may be an integrated part, a minimum unit of the part that performs one or more functions, or a part thereof. For example, according to an embodiment, the module may be implemented in the form of an application-specific integrated circuit (ASIC).

The embodiments of this document may be implemented as software (e.g., program) including one or more instructions stored in a storage medium (e.g., internal memory or external memory) that can be read by a machine (e.g., electronic device). For example, a processor of the machine (e.g., electronic device) may call at least one instruction among one or more of the stored instructions from the storage medium and execute the instruction. This allows the machine to be operated to perform at least one function according to the at least one instruction that is called. The one or more instructions may include a code generated by a compiler or a code that can be executed by an interpreter. The storage medium that can be read by a machine may be provided in the form of a non-transitory storage medium. Here, 'non-transitory' only means that the storage medium is a tangible device and does not include signals (e.g., electromagnetic waves), and this term does not distinguish between a case where data is stored semi-permanently in the storage medium and a case where data is stored temporarily.

According to an embodiment, the methods according to the embodiments disclosed in this document may be provided to be included in a computer program product. Computer program products are goods and may be traded between sellers and buyers. The computer program product may be distributed in the form of a storage medium that can be read by a device (e.g., compact disc read only memory (CD-ROM)) or may be distributed (e.g., downloaded or uploaded) through an application store (e.g., Play Store™) or directly online between two user devices (e.g., smart phones). In the case of online distribution, at least some of computer program products may be at least temporarily stored in a storage medium that can be read by a machine, such as a memory of a manufacturer's server, an application store's server, or a relay server, or temporarily created.

According to an embodiment, each component (e.g., module or program) among the components described above may include a single entity or a plurality of entities, and some of the plurality of entities may be separately placed in other components. According to an embodiment, each component (e.g., module or program) among the components described above may include a single entity or a plurality of entities. According to various embodiments, one or more of the components or operations described above may be omitted, or one or more other components or operations may be added. In substitution or addition, a plurality of components (e.g., modules or programs) may be integrated into a single component. In this case, the integrated component may perform one or more functions of each of the plurality of components in a manner the same as or similar to those performed by a corresponding component of the plurality of components prior to integration. According to an embodiment, the operations performed by the modules, programs, or other components may be executed sequentially, in parallel, iteratively, or heuristically, or one or more of the operations may be executed in a different order or omitted, or one or more other operations may be added.

What is claimed is:

1. A human de-identification information collection device for artificial intelligence learning, the device comprising:
   at least one microphone for capturing sounds generated around a companion animal and generating first audio data and second audio data;
   an inertial measurement device for generating inertial data about a change in acceleration and angular velocity according to movement of the companion animal; and
   a processor for determining each sampling rate for collecting the first audio data, the second audio data, and the inertial data on the basis of at least one among a breed, an age, a gender, whether or not neutered, and a temperament type of the companion animal.

2. The device according to claim 1, wherein the processor defines each interpolation model on the basis of a multiple linear regression algorithm using the sampling rate of each of the first audio data, the second audio data, and the inertial data, and interpolates the first audio data, the second audio data, and the inertial data on the basis of each interpolation model.

3. The device according to claim 2, wherein the processor manages operation modes including an active mode and a low power mode of the at least one microphone, wherein the low power mode is a mode in which the sampling rate for collecting data is low and complexity of the interpolation model is low compared to the active mode.

4. The device according to claim 3, wherein when a voice of a pet parent of the companion animal is identified through the second audio data or when a walking state of the companion animal is identified through the inertial data, the processor sets the at least one microphone to the active mode, and when a sleeping state of the companion animal is identified through the inertial data, the processor sets the at least one microphone to the low power mode.

5. The device according to claim 1, wherein the at least one microphone includes:
   a first microphone for capturing sounds in an audible frequency band of the companion animal, and including a filter for outputting the first audio data in an inaudible frequency band of human being; and
   a second microphone for outputting the second audio data in an audible frequency band of human being.

6. The device according to claim 1, wherein the at least one microphone is a microphone that captures sounds in an audible frequency band of the companion animal and includes a first filter for outputting the first audio data in an inaudible frequency band of human being, and a second filter for outputting the second audio data in an audible frequency band of human being.

7. The device according to claim 1, further comprising a gas sensor for generating olfactory data by detecting gas contained in air around the companion animal, wherein the olfactory data has three concentration levels.

8. The device according to claim 7, wherein the processor defines each interpolation model based on a multiple linear regression algorithm utilizing the sampling rates of each of the first audio data, the second audio data, the inertial data, and the olfactory data, and interpolates the first audio data, the second audio data, the inertial data, and the olfactory data based on each of the interpolation models.

9. The device according to claim 1, further comprising:
   a biometric sensor for measuring at least one among an electrocardiogram (ECG), a photoplethysmogram (PPG), and an electroencephalography (EEG) of the companion animal;
   a Global Positioning System (GPS) for measuring a location of the companion animal; and
   a camera for capturing at least a portion of the companion animal.

10. The device according to claim 1, wherein the collection device is implemented as a smart collar, a smart harness, a wearable device, or an accessory of the companion animal.

11. A human de-identification information collection method for artificial intelligence learning, the method comprising the steps of:
    capturing, using an audio device, sounds generated around a companion animal and generating first audio data and second audio data;
    generating, using an inertial measurement device, inertial data about a change in acceleration and angular velocity according to movement of the companion animal; and
    determining, using a processor, each sampling rate for collecting the first audio data, the second audio data, and the inertial data on the basis of at least one among a breed, an age, a gender, whether or not neutered, and a temperament type of the companion animal.

12. A computer program stored in a recording medium to execute the method of claim 11 in combination with hardware.

* * * * *